United States Patent
Piccoli (10) Patent No.: US 11,834,164 B2
(45) Date of Patent: Dec. 5, 2023

(54) PULSE-INDUCED CYCLIC CONTROL LIFT PROPELLER

(71) Applicant: IQinetics Technologies, Inc., Philadelphia, PA (US)

(72) Inventor: Matthew Piccoli, Philadelphia, PA (US)

(73) Assignee: IQINETICS TECHNOLOGIES INC., Philadelphia, PA (US)

(*) Notice: Subject to any disclaimer, the term of this patent is extended or adjusted under 35 U.S.C. 154(b) by 364 days.

(21) Appl. No.: 17/323,096

(22) Filed: May 18, 2021

(65) Prior Publication Data
US 2021/0354813 A1    Nov. 18, 2021

Related U.S. Application Data

(60) Provisional application No. 63/026,355, filed on May 18, 2020.

(51) Int. Cl.
*B64C 27/39* (2006.01)
*B64C 27/605* (2006.01)

(52) U.S. Cl.
CPC ............ *B64C 27/39* (2013.01); *B64C 27/605* (2013.01)

(58) Field of Classification Search
CPC ............................... B64C 27/39; B64C 27/605
See application file for complete search history.

(56) References Cited

U.S. PATENT DOCUMENTS

| | | | |
|---|---|---|---|
| 5,110,314 A | 5/1992 | Fujihara et al. | |
| 5,259,729 A | 11/1993 | Fujihira et al. | |
| 5,511,947 A * | 4/1996 | Schmuck | B64C 27/32 |
| | | | 416/131 |
| 5,628,620 A | 5/1997 | Arlton | |
| 5,996,933 A | 12/1999 | Schier | |
| 6,824,096 B2 * | 11/2004 | Zoppitelli | B64C 27/41 |
| | | | 244/17.27 |
| 6,863,241 B2 | 3/2005 | Sash | |
| 7,662,013 B2 | 2/2010 | Van De Rostyne et al. | |
| 8,113,905 B2 | 2/2012 | Davis | |
| 8,357,023 B2 | 1/2013 | Van De Rostyne et al. | |
| 8,911,209 B2 * | 12/2014 | Nakao | B64C 27/51 |
| | | | 416/105 |
| 9,840,324 B2 * | 12/2017 | Shiosaki | B64C 27/14 |
| 9,914,535 B2 | 3/2018 | Paulos | |
| 10,232,931 B2 * | 3/2019 | Huddleston, Jr. | B64C 27/32 |
| 10,377,478 B2 | 8/2019 | Muren et al. | |
| 10,486,794 B2 | 11/2019 | Kiesewetter et al. | |
| 10,814,968 B2 | 10/2020 | Gamble et al. | |
| 2019/0031318 A1 | 1/2019 | Judas et al. | |
| 2019/0047688 A1 | 2/2019 | Muren et al. | |
| 2020/0102073 A1 | 4/2020 | Carter et al. | |

FOREIGN PATENT DOCUMENTS

| | | |
|---|---|---|
| WO | 2005087587 A1 | 9/2005 |
| WO | 2014088443 A1 | 6/2014 |

* cited by examiner

*Primary Examiner* — Michael L Sehn
(74) *Attorney, Agent, or Firm* — White and Williams LLP (57) ABSTRACT

The present application relates to a propulsion device having a motor, a mast connected to the motor, an angle sensing device detecting the angle of the mast, a controller receiving the angle of the mast as an input and outputting a motor torque signal to the motor in response thereto, a hub attached to the mast via a single skewed hinge, and a propeller assembly with one or more blades connected to a hub.

21 Claims, 13 Drawing Sheets

PULSE-INDUCED CYCLIC CONTROL LIFT PROPELLER

CROSS-REFERENCE TO RELATED APPLICATIONS

This application claims the benefit of U.S. Pat. App. Ser. No. 63/026,355 filed May 18, 2020, the contents of which are incorporated by reference in its entirety.

TECHNICAL FIELD

The technical field relates to aerial vehicles, specifically those involving passive control mechanisms for variable cyclic pitch propellers and motor pulsing technology.

BACKGROUND OF THE INVENTION

Propeller-based propulsion systems have been around for more than a century, and the evolution of aerial vehicles has given rise to a number of propeller configurations and control methods. Helicopters traditionally use a swashplate to control the vehicle's roll and pitch and a tail rotor to control the vehicle's yaw. Swashplates are an effective mechanism for control, but can be mechanically complex and expensive. In contrast, quadrotors have recently become a popular vehicle design due to their mechanical simplicity. These vehicles, however, require four drive motors, each paired with a fixed pitch propeller to control the roll, pitch, and yaw of the vehicle.

Alternatives to the swashplate have been invented for smaller aerial vehicles, specifically the underactuated mechanisms patented by Fujihira and Paulos. These mechanisms take advantage of separation of time scales to mimic cyclic control. The main rotor with these mechanisms is driven by a motor where low frequency changes of motor torque result in thrust changes, while high frequency motor torque changes result in roll or pitch torques. Though these devices are simpler than a swashplate, they are not without their drawbacks. Manufacturing complexity is increased by the use of either compliant materials or multiple low-friction hinges. Furthermore, some designs result in mass imbalance during actuation, causing vibrations.

A typical aircraft in flight is free to rotate in three dimensions: roll, pitch and yaw. The roll axis runs from the nose to the tail of the vehicle; the pitch axis runs perpendicular from side to side through the vehicle; and the yaw axis runs vertically through the vehicle. Torques, or moments, produce rotations about the principal axes and aircraft intentionally generate such torques by actuating control surfaces to achieve a desired vehicle orientation. There are many types of aircraft from airplanes to traditional helicopters and quadcopters, and the primary differentiator between them is their mechanism for producing roll, pitch, and yaw moments, as well as thrust.

Helicopters typically have a main rotor, a swashplate mechanism, and a tail rotor. The main rotor produces thrust, while the tail rotor creates counter torque and rotates the vehicle about the yaw axis. The swashplate mechanism consists of a series of servo actuators and complex linkages which directly or indirectly change the main propeller's angle of attack, thus producing roll and pitch moments. Although large propellers have inherently slow response times in rotational speed and tip path plane changes, the swashplate mechanism enables high bandwidth control of the vehicle. Actuating the angle of attack of the main rotor blade within one revolution is a technique known as cyclic control.

Swashplates have been used on other vehicles, such as coaxial helicopters. The coaxial design is characterized by two counter-rotating main blades with a swashplate, eliminating the need for a tail rotor. As a result of this rotor configuration, coaxial vehicles tend to be more compact, though at the price of increased height. Traditional helicopters and coaxial vehicles are effective because their propellers have large disc areas, which allows them to produce high thrust per rotor. This in turn allows vehicles to either fly longer or carry heavier payloads. However, as vehicle sizes scale down, the relative size and complexity of the swashplate mechanism makes its implementation increasingly difficult. While the muFly project was able to demonstrate controlled flight on a micro aerial vehicle using a swashplate, the industry largely shifted its focus toward quadrotor designs, which tend to have simpler flight control systems that are more suited for smaller vehicles.

As the name suggests, quadcopters are characterized by four rotors (two spinning clockwise and two spinning counterclockwise) placed symmetrically around the vehicle's center of mass and on the same plane. Each rotor produces lift and torque about its center of rotation. The amount of lift and torque generated by a given rotor is dependent on its thrust, which is a direct result of rotor speed. Quadcopters are therefore controlled by independently varying the speed of each rotor without the need for a swashplate mechanism. A quadcopter produces lift by applying equal thrust to all four rotors; the vehicle adjusts its yaw by varying the net torque, or applying more torque to rotors rotating in one direction and decreasing the torque to rotors rotating in the other direction; it changes its pitch or roll by varying the net center of thrust, or applying more thrust to one rotor (or two adjacent rotors) and less thrust to the opposite rotor (or rotors).

A standard quadcopter is mechanically less complex than a traditional helicopter, replacing the helicopter's various actuators and swashplate with four identical motors paired with fixed propellers. Due to this simplicity and the associated flight control style, the quadcopter has become the preferred setup for small aerial vehicles. While the quadcopter has many advantages over the traditional helicopter, it has several drawbacks. The most notable deficiency is that the quadcopter has an inherently smaller total disc area when compared to a helicopter of equal size because they have four small propellers, which require adequate separation, instead of one (or two in a coaxial setup) large propeller. There is a positive correlation between the diameter of a propeller and the amount of thrust it produces. As a result, a quadcopter needs to spin its propellers faster to generate equivalent thrust to that produced by a helicopter's main rotor. These higher speeds as well as higher disc loading result in lower propeller figure of merit, or in other words aerodynamic efficiency. Flight time and payload capacity are two of the most important attributes of a vehicle, and helicopters have the advantage over quadcopters in this respect due to their larger disc areas.

Despite differences in rotor configuration and control style, both helicopters and quadcopters require four actuators for effective flight control. In an effort to minimize the number of actuators necessary to control an aerial vehicle, other unique rotor configurations have been developed. In U.S. Pat. No. 5,259,729, Fujihira et al. introduce a method of generating control moments in a helicopter by varying the torque of a single main motor. Fujihira's mechanism consists of a propeller with a plurality of blades, each rotating about a center axis to produce unique variations in the tip path plane during rotation. The propeller is driven indirectly by a flexible connecting rod at a point eccentric from the center of rotation. The flexible rod is driven by a single main motor, and the device includes a means for detecting the position of the propeller throughout its rotation. By varying motor torque at specific positions, the connecting rod flexes and changes the propeller's blade tip path. As a result, the main actuator produces thrust, body moments, and at larger deflection angles off axis forces.

Fujihira's device is an example of an underactuated system. Underactuation is a control process which uses the natural dynamics of certain components to enhance the performance of or simplify a particular machine. For aerial vehicles, an underactuated system can be defined as a machine that produces thrust, roll, pitch, and yaw with fewer than four actuators. Fujihira's mechanism produces thrust, roll, and pitch, so it can achieve full control authority by adding a tail rotor to control the vehicle's yaw. While Fujihira achieved underactuation, the stiffness of the compliant hinge inversely determines the control authority and the stiffness has a non-zero practical lower limit on stiffness, resulting in an upper limit on control authority. Finally, this design requires both a compliant hinge as well as a standard hinge about the motor and propeller spin axis. In the case of large deflection, the standard hinge may have to be a ball joint.

In U.S. Pat. No. 9,914,535 B2, Paulos introduces an underactuated, two-hinge propeller design to produce passive cyclic control. Like the Fujihira device, this mechanism relies on motor pulsing, or varying the torque of the motor within one revolution, to generate control moments. These changes in torque are transmitted through the motor shaft to the mast and hub of the propeller. Each propeller blade is attached to the hub via a discrete hinge. At a constant speed, the propeller nominally remains in a neutral position, generating thrust; when the motor increases its torque, the blades hinge into a lag position; as the motor decreases its torque, the blades hinge into a lead position. The blade tip path and blade pitch changes as the rotor blades hinge about the neutral position into lead or lag positions, thus generating control moments (or forces).

The two-hinge setup reduces some of the mechanical complexity associated with the traditional swashplate and Fujihira device. However, there are several drawbacks to Paulos' mechanism. The primary disadvantage is keeping the rotor and propeller system balanced in all flight conditions. Because this setup has two hinges, they can swing independently, which moves the center of mass of the system. This is further complicated by the hinges having opposite angles, meaning a lag creates more pitch for one blade and a lag creates less pitch for the other. The blade which increases pitch with increasing lag is less stable than its counterpart in that as the blade lags, the pitch increases, which causes more drag, which in turn creates more lag and then more pitch. The result is one blade always has more lag than the other even during constant speed rotation. This requires the designer to trim the angles, but this only works for a single operating condition. Another drawback is that there are two hinges, which is twice as many as necessary. Additionally, the two hinges present two potential points of failure, and they have a higher chance of failing or binding since the hinges carry multiple loads, namely a thrust load, a radial centripetal force load, and a torque preventing feathering.

While the Paulos device is mechanically simple, it is more complex and has more sources of failure than necessary. Both of these factors hinder its commercial viability. There is still a need for a reliable and mass manufacturable propulsion system to replace the swashplate and its alternatives.

The proposed invention addresses this and other needs. Disclosed is a technology for achieving cyclic and heave control in one rotor with an underactuated, single-skewed-hinge mechanism for aerial vehicles.

SUMMARY OF THE INVENTION

The invention of the present disclosure includes an underactuated rotor system capable of producing thrust along the axis of propeller rotation as well as torque about both axes that make up the nominal propeller tip path plane. Using lessons learned from other underactuated rotor designs, this invention uses the minimum number of hinges while remaining balanced at all times.

The propulsion mechanism described herein may include a motor, a rotation angle sensor, and the ability to control motor torque based on the rotation angle, a mast connected rigidly to the motor rotor or through a transmission; a single hinge that is angled at nominally but not necessarily 45 degrees to and passes through the vertical, motor rotation axis; a cyclic pitch inducing rotor device where two blades nominally extend horizontally along the feathering axis; and a mechanism for increasing the mass moment of inertia for lead-lag stability of the rotor along the chordwise axis. Supplemental hinges may be added to the mechanism to convert rotor torques into forces such as through the use of a teeter hinge or flap hinges.

BRIEF DESCRIPTION OF THE DRAWINGS

The detailed description is set forth with reference to the accompanying drawings, which are not necessarily drawn to scale. The use of the same reference numbers in different figures indicate similar or identical terms.

DETAILED DESCRIPTION OF ILLUSTRATIVE EMBODIMENTS

Figure 1:
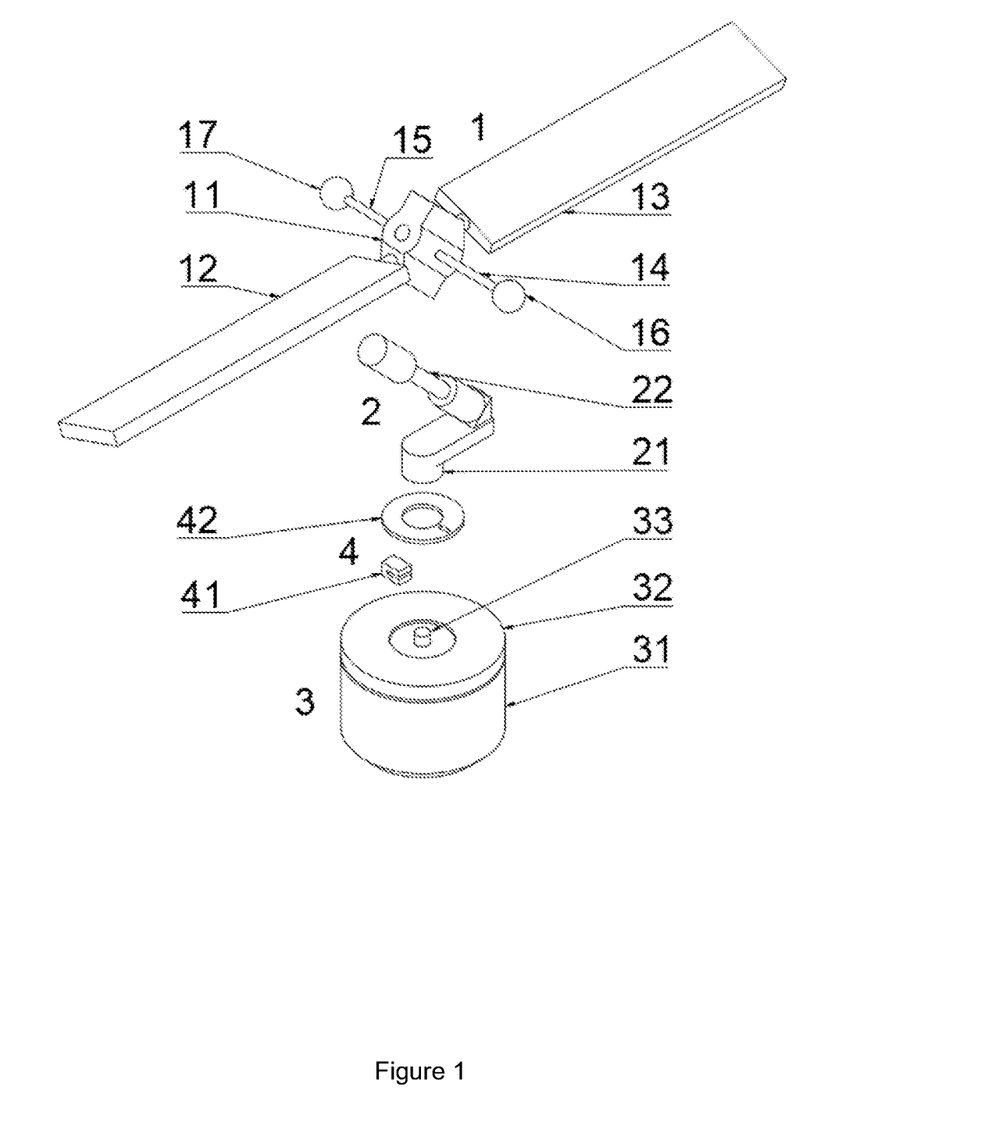
FIG. 1 is an illustration of a single-hinge passive rotor mechanism in an exploded view, according to an aspect of the present disclosure.

FIG. 1 is an exemplary illustration of the single-skewed-hinge passive rotor mechanism in an exploded view, according to an aspect of the present disclosure. The components of this mechanism may include propeller assembly 1, mast assembly 2, motor assembly 3, and encoder assembly 4. The propeller assembly 1 may include a hub 11, blades 12 and 13, flybar arms 14 and 15, and flybar weights 16 and 17. The mast assembly 2 may include a mast 21 and a hinge 22. The motor assembly 3 may include a rotor 31, a stator 32, and a rotor shaft 33. The connection between the rotor and rotor shaft is assumed to be rigid. The encoder assembly 4 may include a fixed sensor 41 and a rotating sensed object 42.

The connection between the mast 21 and the hub 11 may be a single hinge 22 skewed nominally, but not necessarily, at 45 degrees from the vertical mast spin axis towards the feathering axis of the blades 12 and 13. The hub 11 may be attached to components that increase the mass moment of inertia in the chordwise axis for propeller stability. In this aspect, flybar weights 16 and 17 may be connected to the hub 11 via flybar arms 14 and 15 respectively.

Figure 2:
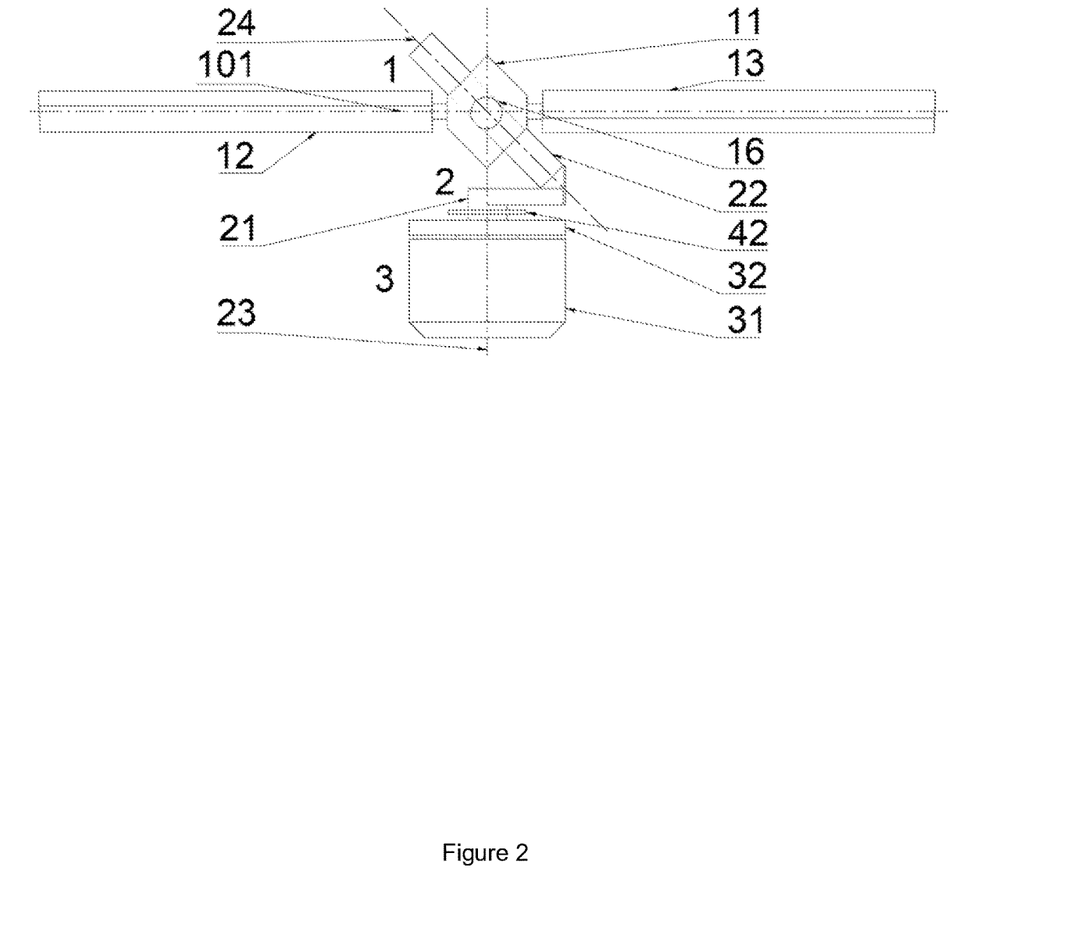
FIG. 2 is an illustration of the axes about which the single-hinge mechanism rotates, according to an aspect of the present disclosure.
Figure 3:
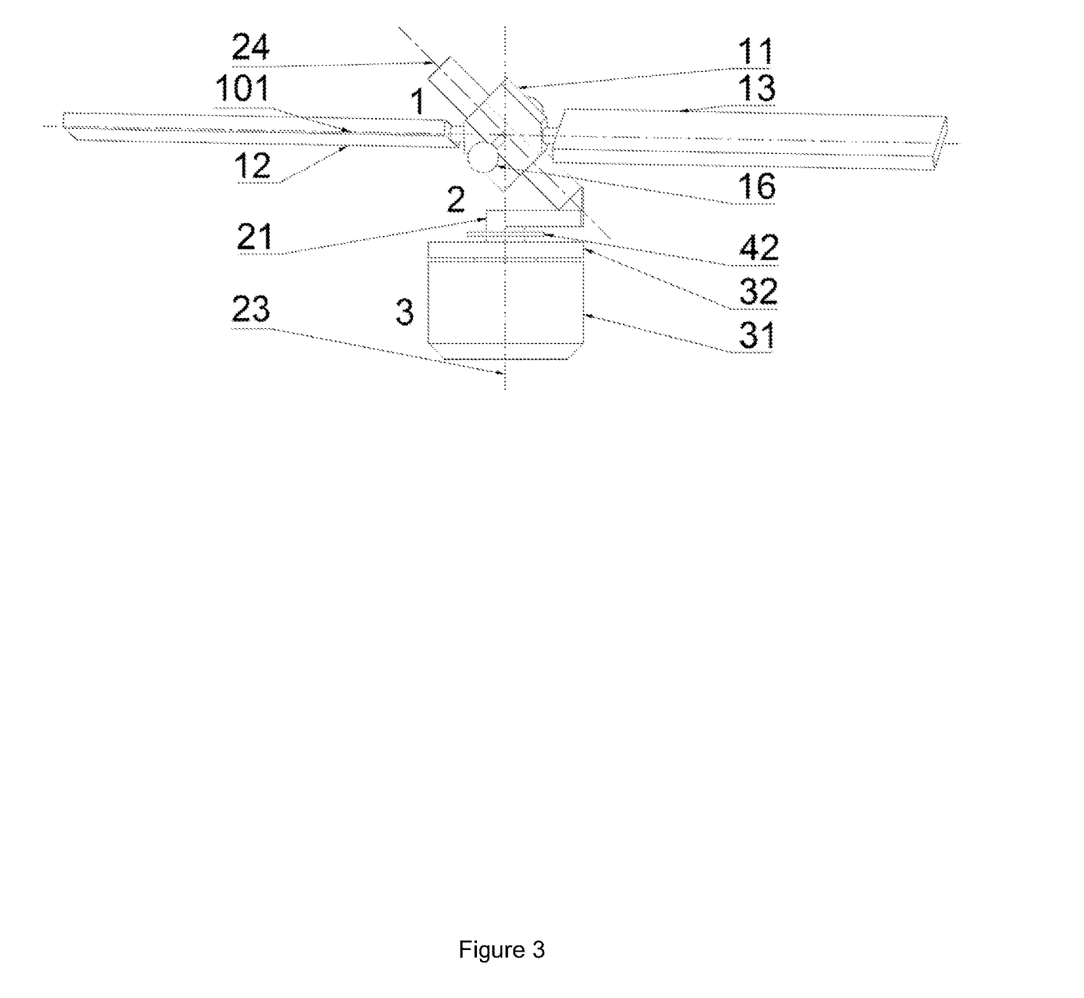
FIG. 3 demonstrates that the mechanism maintains a constant center of mass during operation, according to an aspect of the present disclosure.

FIG. 2 depicts the relevant axes. The propeller assembly 1 and mast assembly 2 rotate about the vertical mast axis 23. The motor rotor 31 and motor rotor shaft 33 may pass through the mast axis 23, though it is not required. The hinge 22 has a hinge axis 24 that passes nominally, but not necessarily, 45 degrees from the mast axis 23 towards the propeller feather axis 101. The propeller feather axis 101 is located at the center of mass of the propeller assembly 1 and parallel to the propeller blades 12 and 13 span direction. The hinge axis 23 is pivoted about the center of mass of the propeller assembly 1. In this way the center of mass of the propeller assembly 1 remains stationary relative to the mast assembly 2 as the propeller assembly 1 rotates about the hinge axis 24, as shown in FIG. 3.

Figure 4:
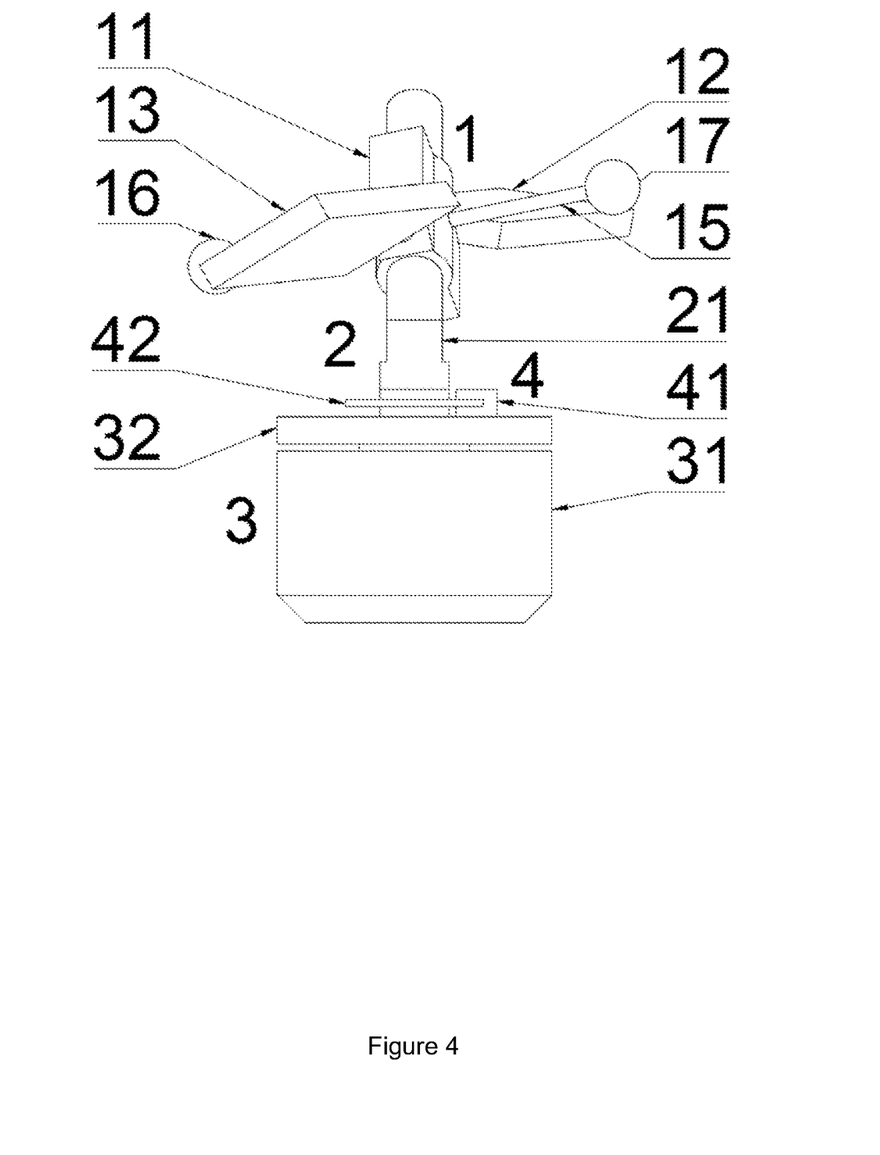
FIG. 4 depicts the single-hinge rotor mechanism in a lag position, which results in increased blade pitch, according to an aspect of the present disclosure.
Figure 5:
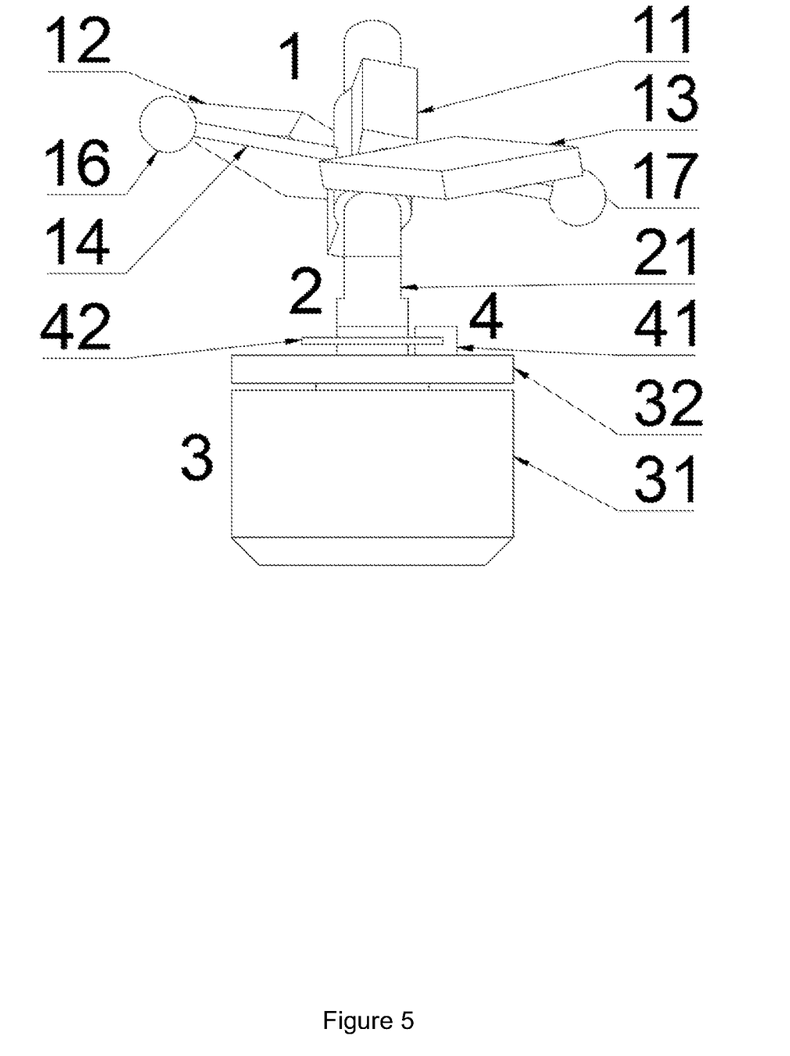
FIG. 5 depicts the single-hinge rotor mechanism in a lead position, which results in decreased blade pitch, according to an aspect of the present disclosure.
Figure 6:
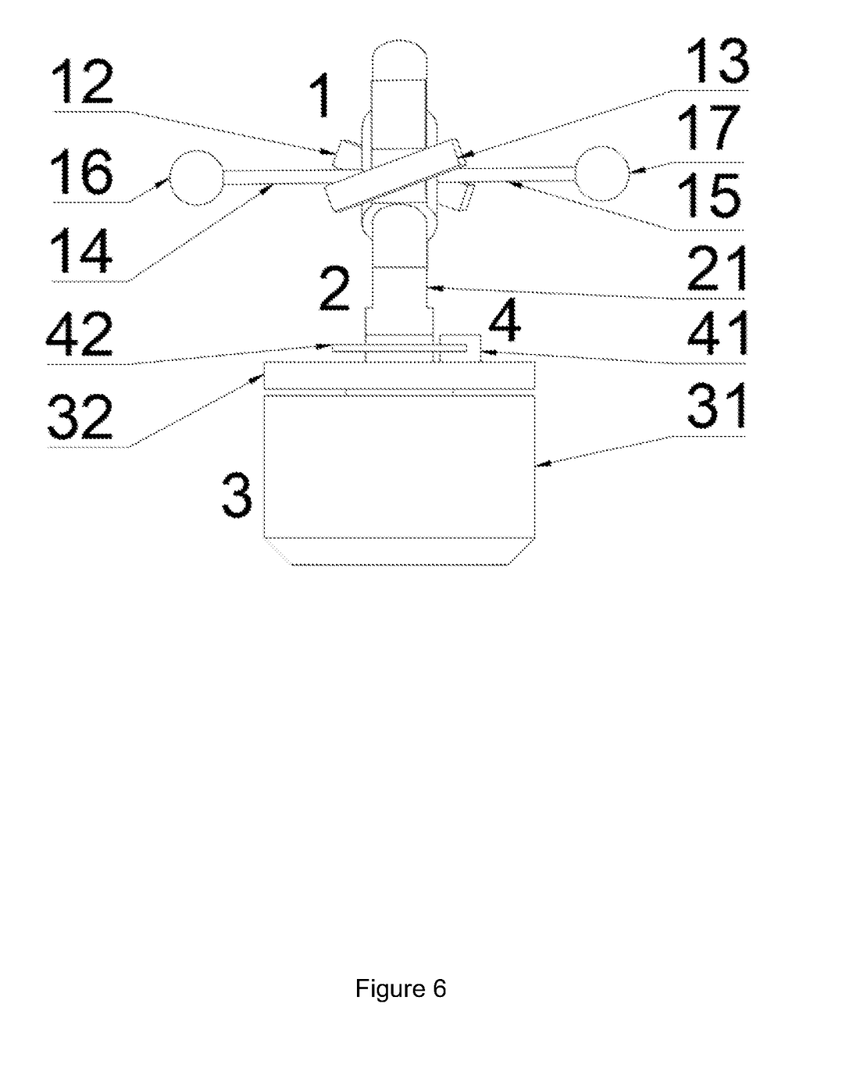
FIG. 6 depicts the single-hinge rotor mechanism in a neutral position, according to an aspect of the present disclosure.

The mast 21 may be connected to the rotating shaft of the motor 33 directly or through a transmission (not shown). As the motor 3 speed increases, the propeller assembly 1, and thus blades 12 and 13, lag. When blade 13 lags, its pitch increases, as shown in FIG. 4. When blade 12 lags, its pitch decreases. As the motor 3 speed decreases, both blades 12 and 13 lead as shown in FIG. 5. When blade 13 leads, its pitch decreases. When blade 12 leads, its pitch increases. At a constant speed, the flybar assembly, which includes flybar weights 16 and 17 and flybar arms 14 and 15, returns the hub 11 toward neutral pitch, as shown in FIG. 6. The length of flybar arms 14 and 15 and mass of flybar weight 16 and 17 can vary the amount of mass moment of inertia, and thus restoring force back to neutral, at the expense of power required to cause a given cyclic motion and therefore the power required to generate a given torque.

Changes in blade pitch (or blade tip path) generate moments, and to control these moments, one needs a knowledge of the propeller's absolute position and an ability to pulse the motor's rotor's torque as a function of the absolute position. Any absolute encoder should suffice.

One method for rotor position sensing requires a diametric magnet attached to the shaft of the motor and a magnetic encoder that sits underneath or beside that magnet. The magnet may be fastened rigidly to the motor, spinning as the motor spins, and the encoder reads the orientation of the magnetic field generated by the magnet to a high degree of precision. That magnetic field orientation can be translated into propeller position, as the motor's rotor is attached to the propeller via the mast.

Another method for rotor position sensing utilizes an absolute optical encoder. A codewheel is attached to the motor's rotor and an optical sensor, either reflective or break-beam, is attached to the motor's stator. Absolute position is deduced by monitoring edges output by the optical sensor. The optical encoder may be any absolute style such as ABI, gray code, or similar.

Yet another absolute encoder for rotor positioning can be achieved by a device that creates a single edge once per rotation. Embodiments include a single line optical encoder 4, as depicted in FIG. 1, a discrete hall sensor, or other sensing method capable of creating one pulse in a known location per revolution. Such a device can measure absolute position by calculating time between edges, inverting that time to calculate velocity, then multiplying that velocity with the time since the last edge was seen.

An electronic speed controller (not shown) then uses that absolute position information, regardless of source, to vary the pulse width modulation of transistors to accelerate and decelerate the motor at specific mast angles to achieve the desired control moments, which are based on specific flight inputs.

Figure 7:
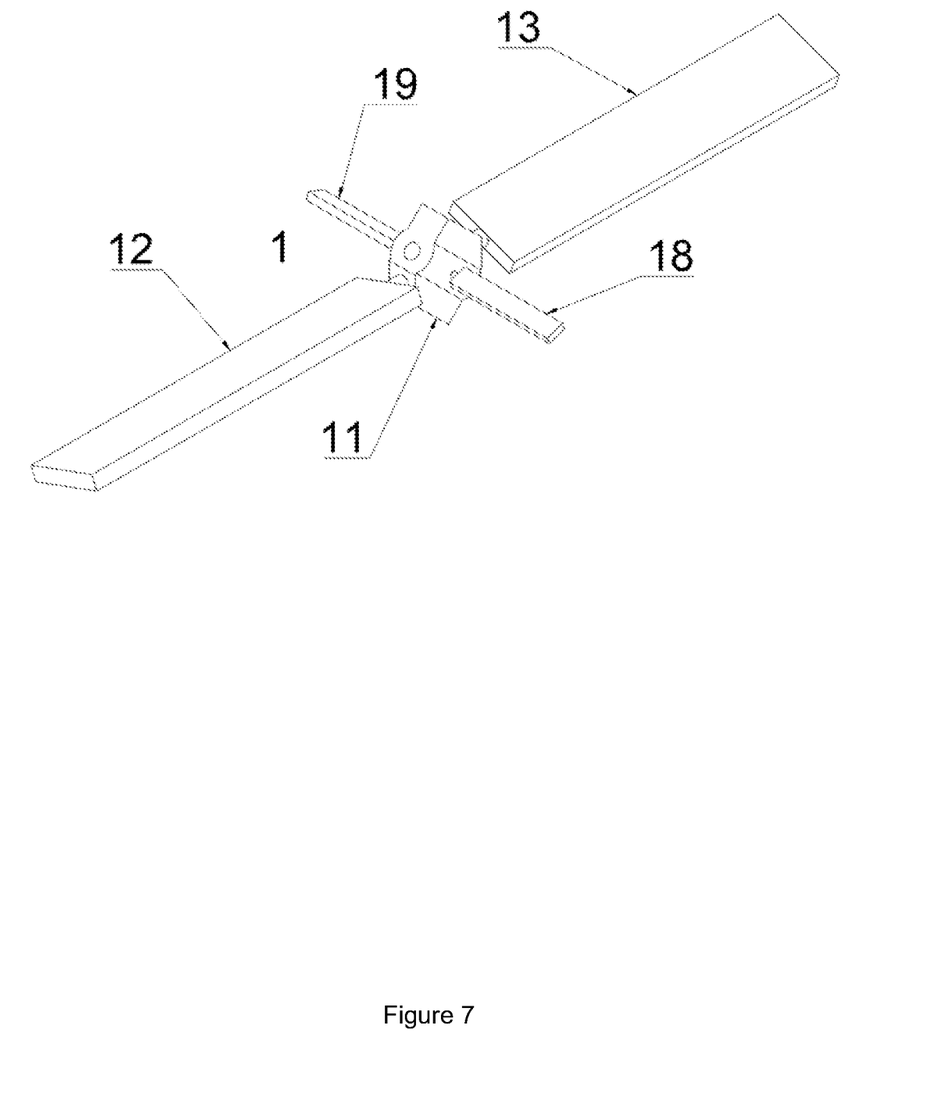
FIG. 7 is an illustration of the stabilizing blades that can be used on the mechanism, according to an aspect of the present disclosure.
Figure 8A:
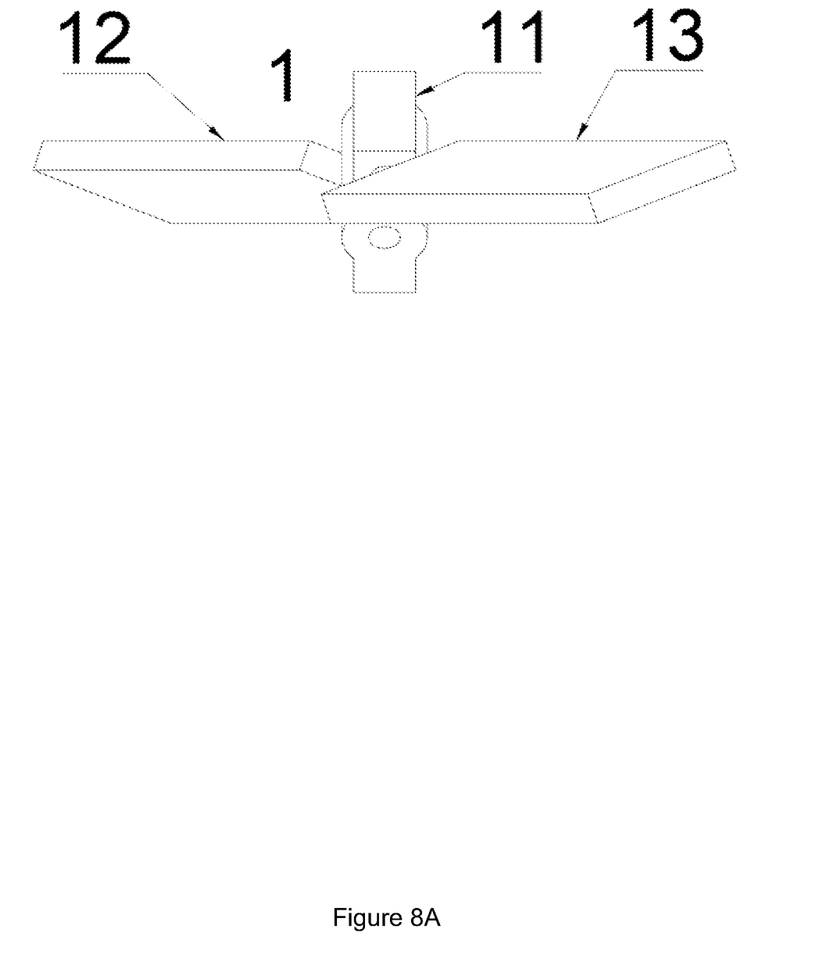
FIG. 8A is an illustration of the mechanism with skewed blades from a side view, according to an aspect of the present disclosure.
Figure 8B:
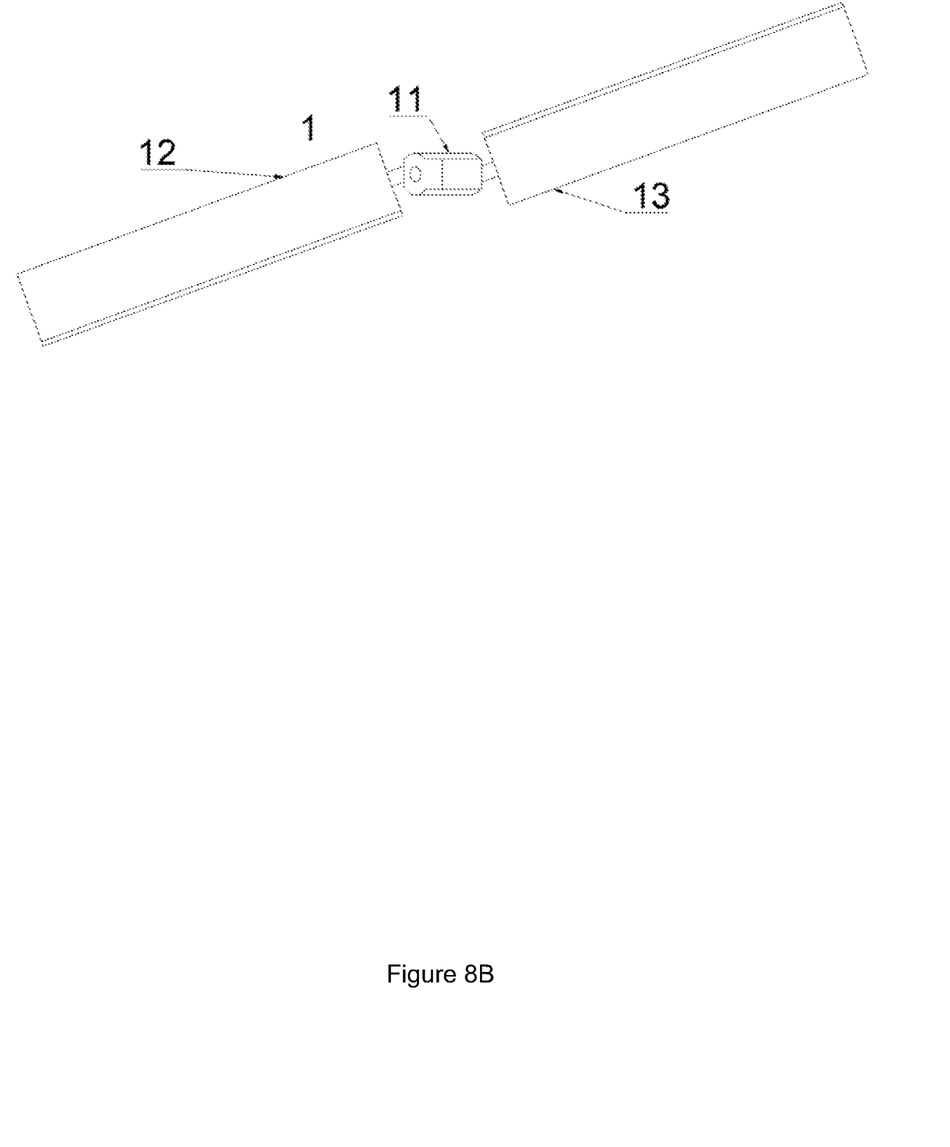
FIG. 8B is an illustration of the mechanism with skewed blades from a top view, according to an aspect of the present disclosure.

The method of applying the necessary mass moment of inertia for stability is not limited to a flybar 14, 15, 16, 17. In place of the flybar 14, 15, 16, 17, another embodiment of the invention may use additional blades of appropriate mass moment of inertia, resulting in a design with three or more blades. FIG. 7 shows such an arrangement with four blades 12, 13, 18, and 19. Blades 18 and 19 need not be the same as blades 12 and 13. Yet another embodiment of the invention may skew the main blades 12 and 13 about the vertical mast spin axis 23 such that the blades are no longer along the nominal feather axis 101, resulting in the same mass moment of inertia in the chordwise axis without requiring a flybar nor extra blades, shown in FIGS. 8A and 8B.

Figure 9A:
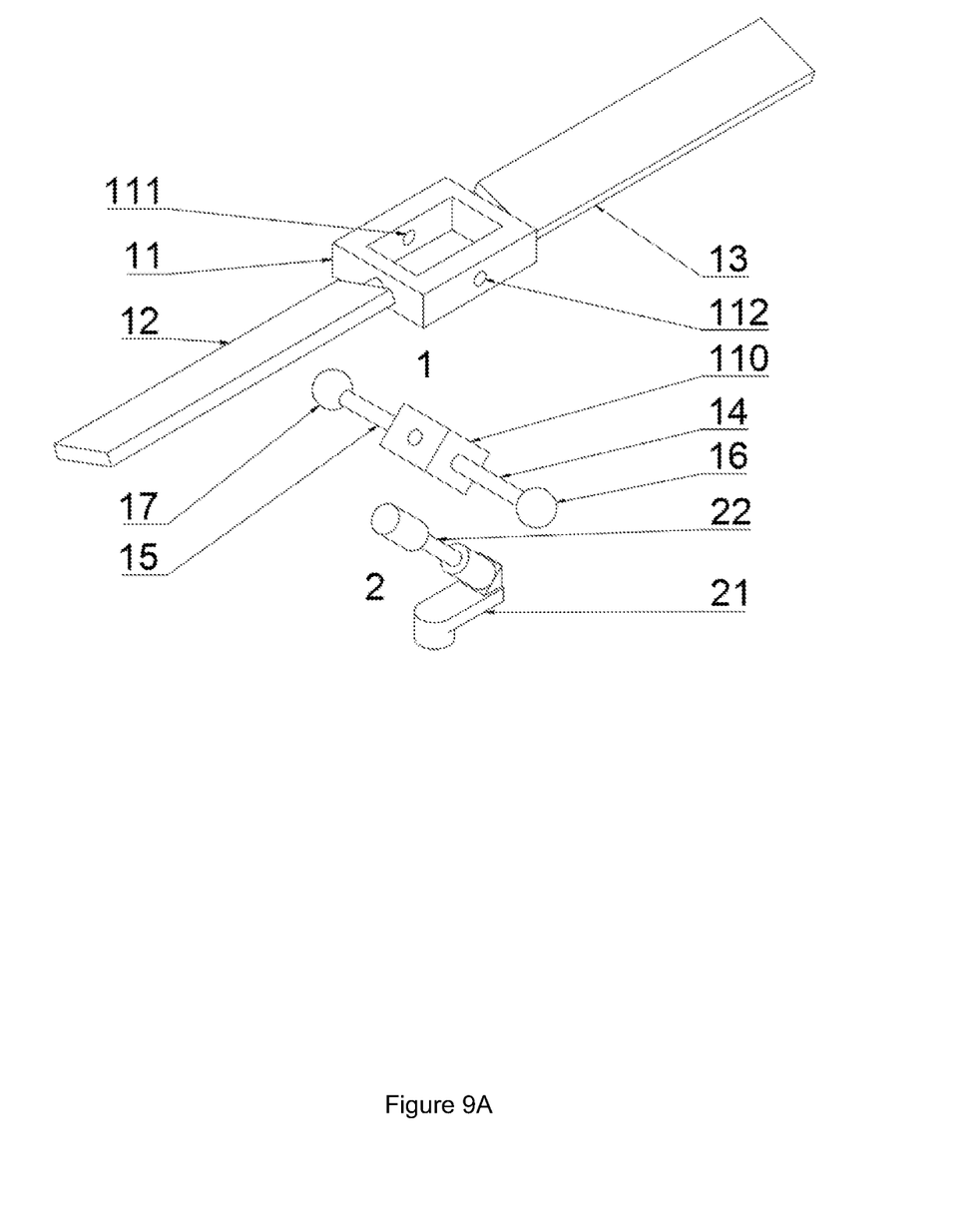
FIG. 9A is an illustration of the mechanism with a supplemental teeter hinge in an exploded view, according to an aspect of the present disclosure.
Figure 9B:
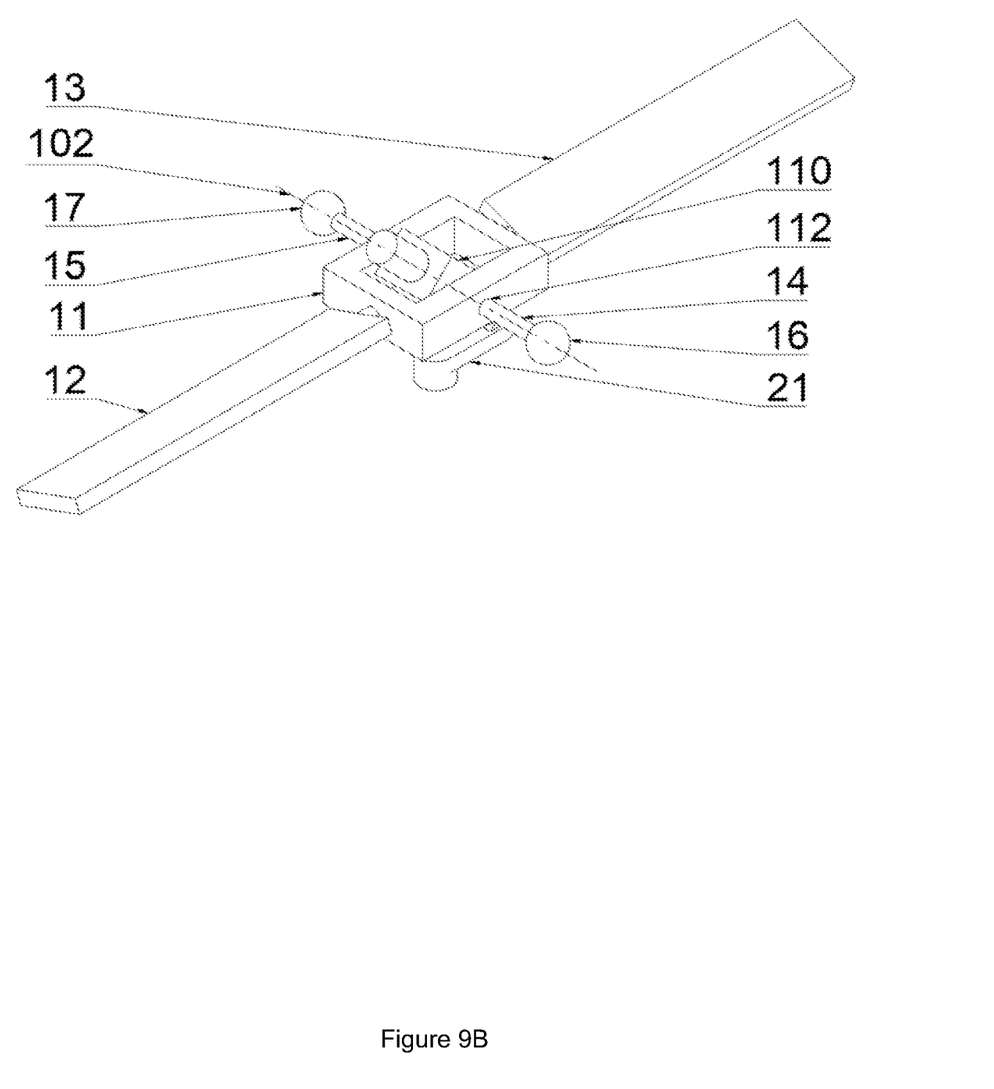
FIG. 9B is an illustration of the mechanism with an assembled supplemental teeter hinge, according to an aspect of the present disclosure.

Supplemental hinges may be added to the rotor mechanism, as is standard in helicopter rotor design. One such hinge is a teeter hinge 15, 16, 111, 112, depicted in FIG. 9, with a teeter axis 102 parallel to the flap axis and intersects the mast rotation axis 23. This axis may also go through the center of mass, though is customarily slightly above in order to keep a coned rotor system balanced and when not in use will lay flat. A teeter hinge prevents torques being transmitted to the mast and instead converts the torques generated by the cyclic control into a change in the tip path plane, and thus vectors thrust. As shown in FIGS. 9A and 9B, an intermediate hub 110 is added between the skewed hinge 22 and the teeter hinge 15, 16, 111, 112. In this embodiment the flybar arms 15, 16 are used as shafts for teeter bearings 111, 112 in the hub 11.

Figure 10:
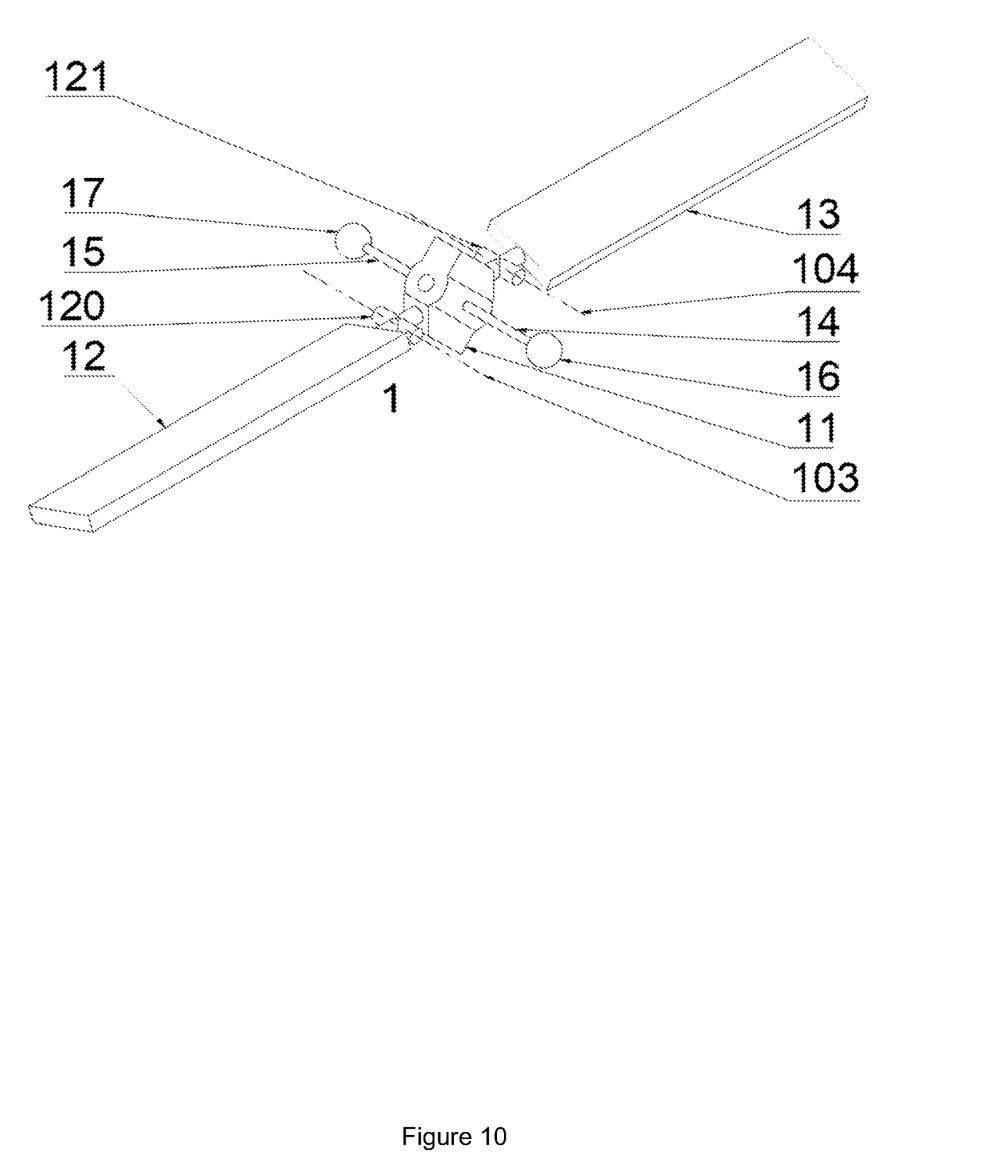
FIG. 10 is an illustration of the mechanism with supplemental flap or coning hinges, according to an aspect of the present disclosure.

Another embodiment of supplemental hinges include flap or coning hinges 120, 121, one for each blade, with axes 103, 104 that do not intersect the mast spin axis 23, as shown in FIG. 10. These hinges act similarly to the teeter hinge, but allow the blades to flap independently. This too adds the ability to vector thrust, at the cost of potentially having imbalanced blades. Another benefit of these supplemental hinges is it allows the blades to fold vertically.

Figure 11:
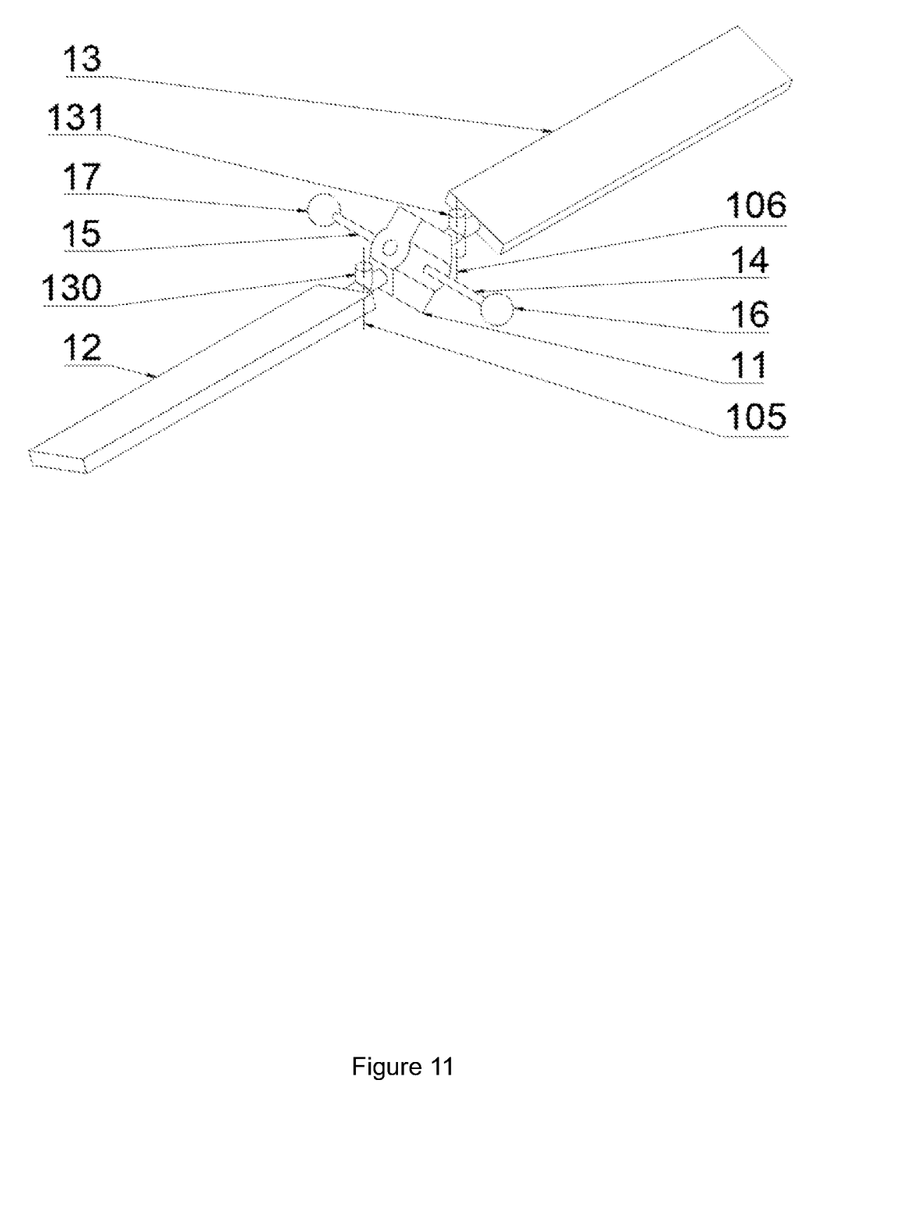
FIG. 11 is an illustration of the mechanism with supplemental lead-lag hinges, according to an aspect of the present disclosure.

Another embodiment of supplemental hinges include purely lead-lag hinges 130, 131 as shown in FIG. 11. The lead-lag hinges 130, 131 are parallel to but not through the mast spin axis 23 and intersecting the feathering axis 101. These hinges are commonly added to allow blade folding. Though these hinges will decrease control authority, it is conceivable that the hub has sufficient mass moment of inertia about the mast's spin axis to allow the propeller assembly, and specifically the hub, to lead and lag about the mast's rotation axis.

At least two features distinguish the invention of the present disclosure from the prior art: a constant center of mass; and a single-hinge 22 connecting the mast 21 and hub 11 components. These concepts create a highly reliable and mass-manufacturable propulsion system for small aerial vehicles. The constant center of mass reduces system vibration, which allows for smoother, more reliable flight. The single-hinge 22 feature minimizes the number of moving components in the device, which makes the device easier and less expensive to manufacture and minimizes the number of potential points of failure.

The written descriptions and illustrative examples above disclose the invention, such that any person skilled in the art can practice the invention, including making and using the mechanism. Such an individual will appreciate that various features disclosed can be used alone or in combination with one another. The patentable scope of the invention is defined by the claims.

As desired, embodiments of the disclosure may include systems with more or fewer components than are illustrated in the drawings. Additionally, certain components of the systems may be combined in various embodiments of the disclosure. The systems described above are provided by way of example only.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

The invention claimed is:

1. A propulsion device comprising:
a motor;
a mast connected to the motor;
an angle sensor detecting the angle of the mast;
a controller receiving the angle of the mast as an input and outputting a motor torque signal to the motor in response thereto;
a hub attached to the mast via a skewed hinge; and
a propeller assembly with one or more blades connected to a hub,
wherein the skewed hinge is skewed such that a rotation of the propeller assembly about a spin axis of the mast causes rotation of the propeller assembly about a feathering axis.

2. The propulsion device of claim 1, wherein an axis of the skewed hinge is angled approximately 45 degrees from a spin axis of the mast towards a feathering axis of the propeller.

3. The propulsion device of claim 1, wherein a rotational axis of the skewed hinge passes through a rotational axis of the mast.

4. The propulsion device of claim 1, wherein a rotational axis of the skewed hinge passes through a center of mass of the propeller assembly.

5. The propulsion device of claim 1, wherein a rotational axis of the mast passes through a center of mass of the propeller assembly.

6. The propulsion device of claim 1, wherein the propeller assembly has sufficient mass moment of inertia along a chordwise axis direction to provide lead-lag and feathering stability.

7. The propulsion device of claim 1, wherein the hub further comprises a supplemental teeter hinge.

8. The propulsion device of claim 1, wherein the propeller assembly further comprises a supplemental flap hinge for at least one blade.

9. The propulsion device of claim 1, wherein the propeller assembly further comprises a supplemental lead-lag hinge for at least one blade.

10. The propulsion device of claim 1, wherein the propeller assembly further comprises a supplemental hinge.

11. The propulsion device of claim 1, wherein the angle sensor resolves the angle of the mast by measuring an angle of the motor or a transmission.

12. A propulsion device comprising:
a motor;
a mast connected to the motor;
an angle sensor detecting the angle of the mast;
a controller receiving the angle of the mast as an input and outputting a motor torque signal to the motor in response thereto;
a hub attached to the mast via a skewed hinge; and
a propeller assembly with one or more blades connected to a hub,
wherein a rotational axis of the skewed hinge passes through a center of mass of the propeller assembly.

13. The propulsion device of claim 12, wherein an axis of the skewed hinge is angled approximately 45 degrees from a spin axis of the mast towards a feathering axis of the propeller.

14. The propulsion device of claim 12, wherein a rotational axis of the skewed hinge passes through a rotational axis of the mast.

15. The propulsion device of claim 12, wherein a rotational axis of the mast passes through a center of mass of the propeller assembly.

16. The propulsion device of claim 12, wherein the propeller assembly has sufficient mass moment of inertia along a chordwise axis direction to provide lead-lag and feathering stability.

17. The propulsion device of claim 12, wherein the hub further comprises a supplemental teeter hinge.

18. The propulsion device of claim 12, wherein the propeller assembly further comprises a supplemental flap hinge for at least one blade.

19. The propulsion device of claim 12, wherein the propeller assembly further comprises a supplemental lead-lag hinge for at least one blade.

20. The propulsion device of claim 12, wherein the propeller assembly further comprises a supplemental hinge.

21. The propulsion device of claim 12, wherein the angle sensor resolves the angle of the mast by measuring an angle of the motor or a transmission.

\* \* \* \* \*